(12) United States Patent
Stimac

(10) Patent No.: US 7,334,033 B2
(45) Date of Patent: Feb. 19, 2008

(54) FABRIC MEMBERSHIP MONITORING

(75) Inventor: Michael D. Stimac, Pacifica, CA (US)

(73) Assignee: Brocade Communications Systems, Inc., San Jose, CA (US)

(*) Notice: Subject to any disclaimer, the term of this patent is extended or adjusted under 35 U.S.C. 154(b) by 1093 days.

(21) Appl. No.: 10/356,389

(22) Filed: Jan. 31, 2003

(65) Prior Publication Data
US 2004/0153540 A1 Aug. 5, 2004

(51) Int. Cl.
G06F 15/173 (2006.01)
G06F 15/177 (2006.01)
H04L 12/26 (2006.01)
H04L 12/28 (2006.01)

(52) U.S. Cl. ............... 709/224; 709/220; 709/223; 370/241; 370/252; 370/254

(58) Field of Classification Search ............... 709/223, 709/224, 238, 244, 220; 370/241, 252, 254
See application file for complete search history.

(56) References Cited

U.S. PATENT DOCUMENTS

| 5,185,860 | A  | * | 2/1993  | Wu .................... | 709/224 |
| 5,787,252 | A  | * | 7/1998  | Schettler et al. ....... | 709/224 |
| 6,108,702 | A  | * | 8/2000  | Wood ................. | 709/224 |
| 6,747,957 | B1 |   | 6/2004  | Pithawala et al. ...... | 370/252 |
| 6,834,298 | B1 | * | 12/2004 | Singer et al. .......... | 709/220 |
| 6,873,602 | B1 | * | 3/2005  | Ambe ................ | 370/254 |
| 6,894,983 | B1 | * | 5/2005  | Lederman et al. ...... | 370/252 |
| 6,944,674 | B2 | * | 9/2005  | Frelechoux et al. ..... | 709/238 |
| 6,954,436 | B1 | * | 10/2005 | Yip et al. ............. | 370/254 |
| 6,980,525 | B2 | * | 12/2005 | Banks et al. ........... | 370/254 |
| 7,035,259 | B2 | * | 4/2006  | Nomura et al. ......... | 370/392 |
| 7,072,986 | B2 | * | 7/2006  | Kitamura et al. ....... | 709/249 |
| 7,120,119 | B2 | * | 10/2006 | Frelechoux et al. ..... | 370/238 |

OTHER PUBLICATIONS

American National Standard of Accredited Standards Committee (NCITS), "Fibre Channel Generic Service-4 (FC-GS-4) REV 7.2," Jan. 22, 2002, pp. ii-275, Published by American National Standards Institute, New York, New York.

* cited by examiner

Primary Examiner—Ario Etienne
Assistant Examiner—Sargon N. Nano
(74) Attorney, Agent, or Firm—Conley Rose, P.C.

(57) ABSTRACT

Systems and methods for monitoring network fabric memberships. In one embodiment, the method comprises: 1) determining a polling list of switches; and 2) processing each switch in the polling list. The processing may include: a) obtaining a list of sister switches from the current switch; b) associating the current switch with a new kith if the current switch is not already associated with a kith; c) identifying any of the sister switches associated with different kiths and merging said different kiths with the kith of the current switch; and d) associating each of the sister switches with the kith of the current switch. (A kith is an inclusive collection of switches constructed by combining lists of sister switches from each switch in the polling list.) The method may further comprise performing a matching operation between the kiths and a set of fabrics in a model of the network.

23 Claims, 3 Drawing Sheets

FIG. 1
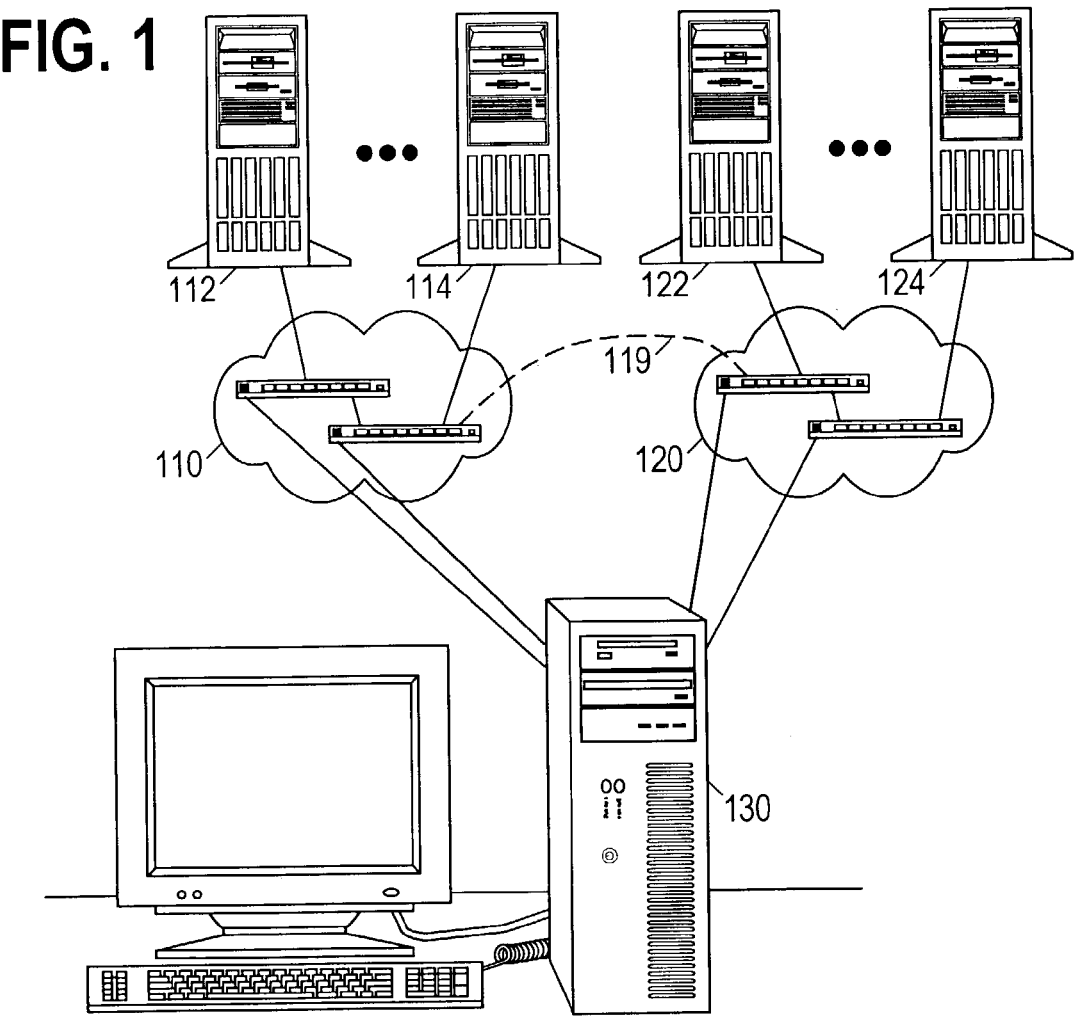
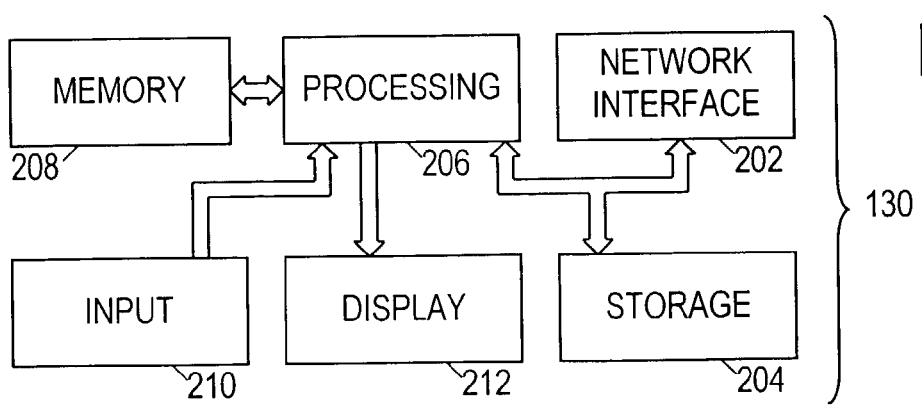
FIG. 2

FABRIC MEMBERSHIP MONITORING

BACKGROUND

Computer networks facilitate communication between computers, and between computers and stand-alone peripherals. They make possible large scale computing systems, distributed service systems, and a whole host of applications that would otherwise be infeasible. Thus, incentives exist for the use and enhancement of computer network technology. As computer networks increase in speed and size, they require more sophisticated protocols to ensure fast and reliable communications. Network configuration and supervision are increasingly important parts of these protocols.

Storage area networks (SANs) are a popular type of computer network. SANs are networks of stand-alone data storage devices (e.g. disk drives). The SAN is usually a sub-network of a larger computer network that includes servers and personal computers. The advantages of SANs include having a large, shared storage capacity that has a high bandwidth access and does not have to be accessed through a server.

Many SANs rely on the Fibre Channel (FC) protocol. A single FC link can carry data at rates exceeding 2 gigabits per second (Gb/s) in both directions simultaneously. The FC protocol defines standard media and signaling conventions for transporting data in a serial fashion. It also provides an error correcting channel code and a frame structure for transporting the data. Further, the FC protocol sets out a buffer-credit-based flow control methodology, and creates some common services (e.g. fabric controller, name server). The FC protocol can be applied to various network topologies including point-to-point, ring, and switched fabric. Further details regarding the FC protocol can be found online at www.fibrechannel.org.

Switched fabric topologies are networks of switches that interconnect end-node devices. Well-designed switches provide at least some degree of automatic configurability. For example, they may automatically sense when a new link is connected to the switch, and may initiate an initialization process to discover what the link connects to. The switch may automatically determine various parameters for the link (e.g. link speed). Other parameters, however, have a more global effect and may not be automatically configurable by the switch. Examples may include zone names, domain names, port names, port identifier lengths, time-out values, security settings, interoperability modes, and long-distance modes. When the link connects switches in two otherwise separately operating fabrics, a mismatch in any of these parameters will prevent communication over the link. Network segmentation is the term for this phenomena: a physically connected network operating as multiple, separate fabrics. (As used herein, the term "fabric" refers to the internal logic view of a network as seen by the switches, while the term "network" refers to a physically-connected set of switches.)

As FC networks are created, updated, maintained and de-commissioned, switches may be enabled, disabled or reconfigured, and links may be added or removed. In effect, networks may split and recombine. Fabric segmentation may occur and be resolved. For large networks, such changes may be expected to be ongoing occurrences. To aid in the administration of FC networks, a network management software package might desirably be used to track the status and membership of network fabrics as they are created, altered and destroyed by changes to the network(s). Such a software package would desirably provide a deterministic method for identifying and tracking fabrics, identifying and tracking switches, and performing fabric membership monitoring. Such a package would preferably be capable of accommodating indeterminate fabric states which may be encountered during periods of automatic discovery and configuration by switches.

SUMMARY

Accordingly, systems and methods for monitoring fabric membership in one or more networks are disclosed. In one embodiment, the method comprises: 1) determining a polling list of switches; and 2) processing each switch in the polling list. The processing may include: a) obtaining a list of sister switches from the current switch; b) associating the current switch with a new kith if the current switch is not already associated with a kith; c) identifying any of the sister switches associated with different kiths and merging said different kiths with the kith of the current switch; and d) associating each of the sister switches with the kith of the current switch. (A kith is an inclusive collection of switches constructed by combining lists of sister switches from each switch in the polling list.) The method may further comprise performing a matching operation between the kiths and a set of fabrics in a model of the network. Unmatched fabrics may be deleted or inactivated, while new fabrics may be added for unmatched kiths.

BRIEF DESCRIPTION OF THE DRAWINGS

A better understanding of the present invention can be obtained when the following detailed description of the preferred embodiment is considered in conjunction with the following drawings, in which:

FIG. 1 shows an exemplary environment for monitoring of multiple networks;

FIG. 2 shows a functional block diagram of network management system hardware;

Figures 3, 4:
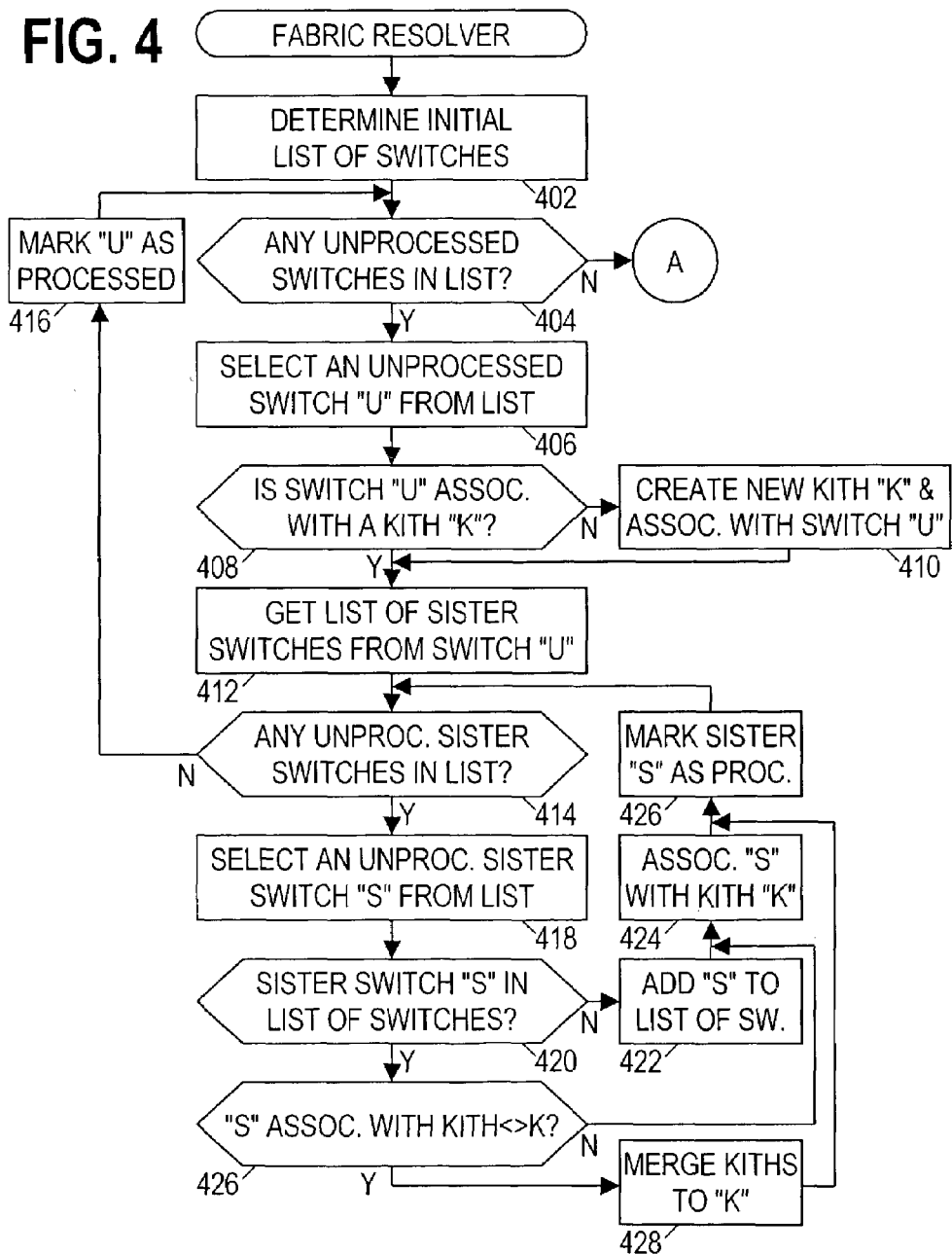
FIG. 3 shows a functional block diagram of network management system software.
FIGS. 4 and 5 show a flowchart of a preferred fabric membership monitoring method.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to the figures, FIG. 1 shows two switched Fibre Channel (FC) fabrics 110, 120 that each include a plurality of switches. The switches of fabric 110 transport communications between end nodes 112-114, and the switches of fabric 120 transport communications between end nodes 122-124. A network management system 130 is preferably coupled to each of the switches in the fabrics 110, 120. The coupling may be accomplished in any number of ways, including: connecting the system 130 to each of the fabrics as an end node device; and connecting the system 130 to each of the switches using Ethernet connections or some other form of computer network.

FIG. 1 shows an imminent change to the networks in the form of a proposed inter-switch link (ISL) 119. The addition of ISL 119 may allow the fabrics 110, 120 to merge, or the fabrics 110, 120 may continue to operate separately due to some configuration incompatibility. On the other hand, if the fabrics 110, 120 had been cooperating as a single fabric, the removal of ISL 119 would cause the fabrics 110, 120 to begin operating independently. Other potential changes to the networks include the reconfiguration or removal of a switch. Such a change could also potentially cause fabric segmentation. System 130 is preferably configured to monitor fabrics as they segment, separate, or merge, and to monitor switches as they are added, reconfigured, or removed.

FIG. 2 shows a functional block diagram of a preferred network management system 130. The system preferably includes an interface module 202 that allows access to configuration information for each of the switches being monitored. Interface module 202 may simply be a network interface card, or it may be a host bus adapter (HBA). Other suitable implementations may alternatively be used. The interface module 202 preferably operates under control of processing module 206 to retrieve switch configuration information and to store the switch configuration information in storage module 204.

Storage module 204 maintains a copy of the configuration information for access by the processing module 206. Storage module 204 may take the form of dynamic random access memory (DRAM), static random access memory (SRAM), Flash ROM (read only memory), optical storage media, magnetic storage media, or any combination thereof. Note that storage module 204 (or a portion thereof) may be removable so as to be portable between systems. Storage module 204 may further maintain a copy of software for fabric membership monitoring as described further below.

Processing module 206 accepts instructions from a user via input module 210, and responsively performs a method of fabric membership monitoring preferably as described hereinbelow. The processing module 206 may use storage module 204 for temporary and long term storage of information as it operates. Results of the monitoring may be displayed in some form to the user by display module 212.

Software in the network management system 130 is preferably implemented as shown in FIG. 3. A browser application 302 preferably presents a graphical user interface (GUI) through which a user can locate and trigger a fabric manager application 304. The fabric manager application is preferably a Java Application that runs in the operating system environment rather than being contained within the browser environment. To enable this, a plug-in may be employed such as Sun's Java Web Start Plug-in, which enables Java Applications to be launched from a web browser, e.g. by clicking on a uniform resource locator (URL) link in an hyper-text markup language (HTML) web page. An alternative method of enabling execution outside the browser environment would be to use a single-file installer. Clicking on a link would cause the single-file installer to be downloaded to a local disk drive. The user might then need to take the extra step of leaving the browser environment to execute the installer, which could in turn install and execute the fabric manager application 304.

The fabric manager application 304 provides the user with a GUI through which the user can obtain fabric existence and membership information from switches in one or more networks. The fabric manager application 304 accesses the switch configuration information through a network access interface 306. The network access interface 306 may preferably comprise software procedure calls that cause the system's interface module 202 to transmit properly-formatted inquiries to the switches and to convey their responses. The switches may each be provided with unique network addresses to facilitate such access.

The fabric manager application 304 preferably automates much of the network management process by providing automated status and event logging, and by providing an alert system to notify the user of conditions needing immediate attention. It preferably supports the simultaneous monitoring and configuration of multiple fabrics, both in terms of physical groups of switches, and in terms of user-specified logical groups. The fabric manager is preferably also able to determine and monitor the ISL configuration of each fabric.

In a preferred embodiment, the fabric manager is optionally able to initiate firmware downloads to the switches, and to conduct sequenced rebooting of the fabric switches. The user may be allowed to establish a baseline switch configuration, and to upload this baseline configuration to each of the switches. However, a user is preferably required to enter passwords for access to secure switches, or otherwise satisfy security precautions.

The fabric manager application 304 preferably provides zone and merge testing, in which the application 304 determines whether an attempted merging of multiple networks would succeed, and if not, why not. Such zone and merge testing could also be used to determine why an attempted merging of multiple networks failed. The zone and merge testing preferably checks those parameters of network operation that the switches fail to account for when configuring for merged operation with another network. The fabric manager application 304 may further determine ways to resolve conflicts that prevent fabric merging.

Most pertinent to the present disclosure, the fabric manager application 304 preferably maintains an internal model of fabrics within the one or more networks being monitored. The fabric manager application 304 may periodically poll the switches, both those already known and those newly discovered, to determine each switch's view of the local fabric. The fabric manager application 304 may then combine these views to determine a current model of fabrics within the network(s) being monitored. Other portions of the fabric manager application 304 may then use the current model for other tasks, e.g. informing a user of current network status.

Figure 5:
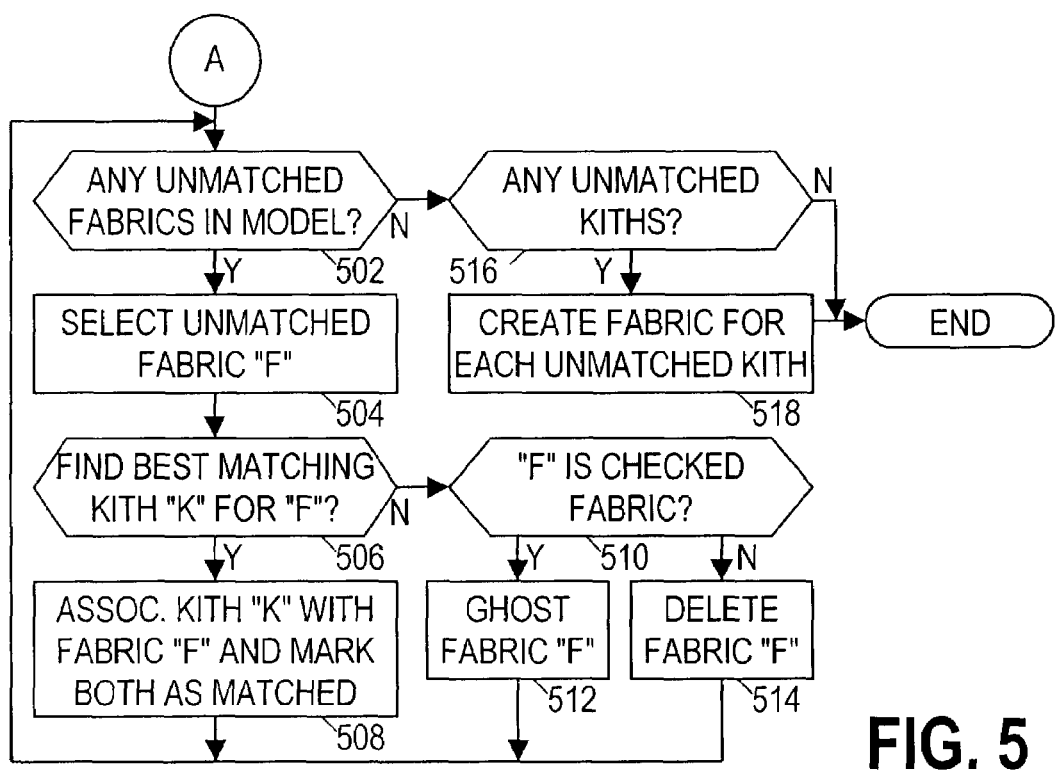

FIGS. 4 and 5 show a flow diagram of one fabric membership monitoring method embodiment. The flow diagram has been drawn in two parts that are functionally connected via node A. Fabric manager application 304 preferably performs the fabric membership monitoring method repeatedly. The method may be performed at periodic intervals, performed at less regular but more convenient intervals, or performed on an as-needed basis. Before the initiation of the method, the user has presumably configured the fabric manager application 304 in a way that permits the fabric manager application to contact switches in multiple networks and to retrieve configuration and status information from each switch. This contacting may be performed by the method itself, or alternatively, the contacting may be performed by a background process and the information stored locally for use by the fabric membership monitoring method.

Beginning then in FIG. 4, the application 304 initiates the fabric membership monitoring method by, e.g., issuing a subroutine call to a fabric resolver process. The process begins with block 402 where an initial list of polled switches is determined. This list may have been initially established by a user or by a reading a stored data file. This initial list may have been augmented by previous iterations of fabric resolver process and/or by add and remove operations of other portions of the fabric manager application 304.

In subsequent blocks of the process, the processing module 206 iterates through the list of polled switches. In one embodiment, this iteration is performed by associating a flag with each switch and beginning each iteration by setting the flags to a state that indicates that the switches have not yet been processed. As each polled switch is processed, the corresponding flag is set. The iterations begin (and eventually end) in block 404 where the processing module 206 determines whether any unprocessed switches remain in the list. When none remain, the process continues as described below with reference to FIG. 5.

If any unprocessed switches remain, then in block 406, the processing module 206 selects one unprocessed switch "U" upon which the iteration is based. A verification step may be performed to verify that the selected switch is enabled. Switches that cannot be contacted may be deleted from the list of polled switches, at least for the current performance of the fabric resolver process.

In each iteration, processing is performed to determine kith membership for the selected switch U. A kith is hereby defined to be a collection of switches that claim to be coupled. Such a claim is not necessarily mutual, thus a switch "A" and a switch "B" will be in the same kith if either one claims to be coupled to the other. However, claims of coupling are transitive, such that if a switch A claims to be coupled to a switch B which in turn claims to be coupled to a switch "C", then all three switches are in one kith, despite the potential ignorance by switches B and C of switch A's existence. Kith membership is re-determined each time the fabric resolver process is performed.

In block 408, the processing module 206 determines whether switch U is already associated with a kith. This would be the case if, for example, a previously processed switch had claimed to be coupled to switch U. The kith associated with switch U is preferably identifiable by some value "K". If switch U has not been associated with a kith, then in block 410, a new kith value K is created and associated with switch U. In block 412, the processing module 206 obtains from switch U a list of sister switches; that is, a list of all switches to which switch U claims to be coupled (directly or indirectly). Processing module 206 next processes each sister switch in the sister switch list.

In block 414, the processing module 206 checks to determine if the sister switch list contains any sister switches that have not yet been processed. If the processing of sister switches is complete, then in block 416, the processing module 206 sets the flag for switch U to indicate that it has been processed, and control returns to block 404. On the other hand, if one or more sister switches has not yet been processed, then in block 418, one sister switch "S" is chosen for processing.

In block 420, a check is made to determine whether the sister switch S is included in the list of polled switches. If not, then sister switch S is added to the list of polled switches in block 422, and in block 424 the sister switch is associated with kith K. In block 426, sister switch S is marked as processed, and control returns to block 414.

If sister switch S was already in the list of polled switches in block 420, then in block 426, a check is made to determine if sister switch S is already associated with a kith other than kith K. If not, e.g., if sister switch S has not yet been associated with a kith, then control passes to block 424 where sister switch S is associated with kith K. On the other hand, if sister switch S has already been associated with a different kith, then in block 428, processing module 206 merges kith K with the different kith. Assuming the different kith value is K', the merging may be done by searching the list of switches for switches associated with kith K', and substituting the value K for K'. Once the merge is complete, control returns to block 426 where the sister switch S is marked as processed.

In this manner, processing module 206 works its way through the list of polled switches, associating each with a kith and obtaining a list of sister switches from each. Each of these sister switches in turn is added to the polling list if not already present, and is associated with the same kith as the switch claiming to be coupled to the sister switch. Any overlaps in tentative kiths are resolved by merging the kiths together. Once the list of polled switches has been processed, the kiths will have been determined. Such is the case as control passes from block 404 (FIG. 4) to block 502 (FIG. 5).

As mentioned previously, the fabric manager application 304 preferably determines a model of the fabrics in the network(s) being monitored. (This model may initially be empty.) In FIG. 5, the processing module 206 performs a matching operation in which the fabrics in the model are compared to the kiths. This matching operation is performed each time the fabric resolver process is performed. The fabrics in the model are preferably associated with a list of one or more switches.

In block 502, the processing module 206 determines whether any fabrics in the model have not yet been matched. If so, an unmatched fabric "F" is selected in block 504. In block 506, the processing module 206 finds a kith that "best matches" the selected fabric F. The determination of best match may be done by first identifying the kiths that have some overlap with the fabric, i.e. the kiths that include at least one switch in the fabric. From these kiths, a best match is chosen. In one embodiment, the best match is chosen by identifying the kith having the largest number of switches in the fabric. A tie-breaking process may be followed if multiple such kiths are found. In an alternative embodiment, each fabric in the model has a "launch switch" associated with it, i.e. a particular switch that may serve as a representative of the fabric. In this alternative embodiment, the best match may be chosen by identifying the kith having the corresponding launch switch.

If a best matching kith is found, it is associated with fabric F in block 508 and marked as matched. The fabric may also be marked as "matched" before control returns to block 502. If no best match is found (e.g., none of the unmatched kiths overlap the selected fabric), then in block 510 the processing module determines whether the fabric F is a checked fabric.

A checked fabric is a fabric that is to be kept and re-checked even in the absence of any enabled switches. In the absence of a matching kith, the checked fabric is "ghosted" in block 512. That is, the fabric is preserved for future checking, but is marked as inactive and "matched". In block 514, fabrics that are not specially designated as checked fabrics are deleted in the absence of a matching kith. From blocks 512 and 514, control returns to block 502.

Once each of the fabrics in the model have been matched, ghosted, or deleted, control passes from block 502 to block 516. In block 516, the processing module 206 determines whether any unmatched kiths remain, or whether all of the kiths have been matched to existing fabrics. If no unmatched kiths remain, the fabric resolver process terminates. Otherwise, in block 518 the processing module 206 creates a new fabric for each unmatched kith. The fabric resolver process may then terminate. As previously mentioned, the fabric resolver process is preferably repeated after some interval to provide for tracking of the network status.

The results of the fabric resolver process may be further processed by fabric manager application 304 and displayed in some form to the user. The fabric manager application preferably provides tools for the user to obtain further details regarding each switch and fabric, and tools for the user to adjust switch and fabric configurations. It is expected that the user's network management tasks will be significantly eased by use of the fabric resolver process.

In the above description, the iteration processes were performed using a flag-checking method. Other suitable iteration techniques are known and may be used. For example, programming language constructs such as a FOR-NEXT loop, a WHILE-WEND loop, a REPEAT-UNTIL loop, and a Java "iterator" construct may alternatively be used.

Numerous variations and modifications will become apparent to those skilled in the art once the above disclosure is fully appreciated. It is intended that the following claims be interpreted to embrace all such variations and modifications.

What is claimed is:

1. A fabric membership monitoring method that comprises: determining a polling list of switches; for each current switch in the polling list of switches: obtaining a list of sister switches from the current switch; associating the current switch with a new kith if the current switch is not already associated with a kith; identifying any of the sister switches associated with different kiths and merging said different kiths with the kith of the current switch; and associating each of the sister switches with the kith of the current switch determining a fabric membership based on one or more of the kiths, and, displaying the fabric membership.

2. The method of claim 1, further comprising:
adding sister switches absent from the polling list of switches to the polling list of switches.

3. The method of claim 1, further comprising:
for each fabric in a list of fabrics:
determining a kith that best matches said fabric if one or more unmatched kiths overlap said fabric.

4. The method of claim 3, fruther comprising:
for each fabric in the list of fabrics:
deleting said fabric from the list of fabrics if no unmatched kiths overlap said fabric.

5. The method of claim 3, further comprising:
for each fabric in the list of fabrics:
ghosting said fabric if no unmatched kiths overlap said fabric and said fabric is a checked fabric.

6. The method of claim 3, further comprising:
for each unmatched kith after operating on each fabric in the list of fabrics:
adding said kith as a fabric to the list of fabrics.

7. The method of claim 1, wherein said merging includes:
associating with the kith of the current switch every switch identified as associated with said different kiths.

8. A network management system that comprises:
a network interface module that couples the network management system to switches one or more networks;
a storage module configured to store software; and
a processing module coupled to the storage module and to the network interface module, wherein the processing module retrieves and executes the software, wherein the software configures the processing module to:
process a polling list,
for each switch in the polling list, to;
obtain a list of sister switches from said switch;
associate said switch with a new 16th if said switch is not already associated with a kith;
identify any of the sister switches associated with different kiths and to merge the different kiths with the kith of said switch; and
to associate each of the sister switches with the kith of said switch;
determine a fabric membership based on one or more of the kiths, and display the fabric membership.

9. The system of claim 8, wherein the software further configures the processing module to add to the polling list any sister switches found to be absent.

10. The system of claim 8, wherein the software further configures the processing module to determine, for each model fabric having one or more unmatched overlapping kiths, a kith that best matches said fabric.

11. The system of claim 10, wherein the software further configures the processing module to delete each model fabric not having any unmatched overlapping kiths unless said model fabric is a checked fabric.

12. The system of claim 10, wherein the software further configures the processing module to ghost each checked fabric not having any unmatched overlapping kiths.

13. The system of claim 10, wherein the software further configures the processing module to create a new model fabric for each unmatched kith remaining after all model fabrics have been operated on.

14. The system of claim 8, wherein the network interface module is coupled to the switches via an Ethernet connection.

15. The system of claim 8, wherein the switches are Fibre Channel switches.

16. The system of claim 8, wherein the network interface module is coupled to one of the switches via a Fibre Channel link.

17. The system of claim 8, wherein the processing module is coupled to an input module to receive input from a user, and wherein the processing module is coupled to a display module to display the report to the user.

18. An information storage medium operable to provide a programmable system with software that configures the system to:
process a polling list, and
for each switch in the polling list, to:
obtain a list of sister switches from said switch;
associate said switch with a new kith if said switch is not already associated with a kith;
identify any of the sister switches associated with different kiths and to merge the different kiths with the kith of said switch; and
to associate each of the sister switches wit the kith of said switch; determine a fabric membership based on one or more of te kits, and display the fabric membership.

19. The medium of claim 18, wherein the software further configures the processing module to add to the polling list any sister switches found to be absent.

20. The medium of claim 18, wherein the software further configures the processing module to determine, for each model fabric having one or more unmatched overlapping kiths, a kith that best matches said fabric.

21. The medium of claim 20, wherein the software further configures the processing module to delete each model fabric not having any unmatched overlapping kiths unless said model fabric is a checked fabric.

22. The medium of claim 20, wherein the software further configures the processing module to ghost each checked fabric not having any unmatched overlapping kits.

23. The medium of claim 20, wherein the software further configures the processing module to create a new model fabric for each unmatched kith remaining after all model fabrics have been operated on.

\* \* \* \* \*